(12) United States Patent
Chen et al.

(10) Patent No.: US 9,043,587 B1
(45) Date of Patent: *May 26, 2015

(54) COMPUTER SECURITY THREAT DATA COLLECTION AND AGGREGATION WITH USER PRIVACY PROTECTION

(75) Inventors: Yi-Fen Chen, Pasadena, CA (US); Shuosen Robert Liu, Cupertino, CA (US)

(73) Assignee: Trend Micro Incorporated, Tokyo (JP)

( * ) Notice: Subject to any disclaimer, the term of this patent is extended or adjusted under 35 U.S.C. 154(b) by 425 days.

This patent is subject to a terminal disclaimer.

(21) Appl. No.: 13/542,445

(22) Filed: Jul. 5, 2012

Related U.S. Application Data

(63) Continuation of application No. 12/424,419, filed on Apr. 15, 2009, now Pat. No. 8,239,668.

(51) Int. Cl.
  *H04L 29/06* (2006.01)
  *G06F 21/55* (2013.01)

(52) U.S. Cl.
  CPC .......... *G06F 21/552* (2013.01); *H04L 63/1408* (2013.01)

(58) Field of Classification Search
  CPC ... H04L 63/1408; G06F 21/55; G06F 21/552; G06F 21/56
  USPC ............................... 713/150, 153; 726/22–24
  See application file for complete search history.

(56) References Cited

U.S. PATENT DOCUMENTS

| | | | |
|---|---|---|---|
| 5,442,699 A | 8/1995 | Arnold et al. | |
| 5,550,976 A | 8/1996 | Henderson et al. | |
| 6,075,863 A | 6/2000 | Krishnan et al. | |
| 6,081,894 A | 6/2000 | Mann | |
| 6,363,489 B1 * | 3/2002 | Comay et al. | 726/22 |
| 6,393,568 B1 | 5/2002 | Ranger et al. | |
| 6,609,196 B1 | 8/2003 | Dickinson, III et al. | |
| 6,944,769 B1 | 9/2005 | Daniels et al. | |
| 7,096,254 B2 | 8/2006 | Awada et al. | |
| 7,162,738 B2 | 1/2007 | Dickinson, III et al. | |
| 7,260,725 B2 | 8/2007 | Carmona et al. | |
| 7,302,584 B2 | 11/2007 | Tarbotton et al. | |
| 7,308,703 B2 | 12/2007 | Wright et al. | |

(Continued)

OTHER PUBLICATIONS

Aggregating Distributed Sensor Data for Network Intrusion Detection, McEachen et al, IEEE, 2006.*
Integration of Secure In-Network Aggregation and System Monitoring for Wireless Sensor Networks, Xing Jin et al, IEEE, 2007.*

*Primary Examiner* — Luu Pham
*Assistant Examiner* — Jahangir Kabir
(74) *Attorney, Agent, or Firm* — Okamoto & Benedicto LLP

(57) ABSTRACT

An endpoint computer in an enterprise network is configured to detect computer security threat events, such as presence of a computer virus. Upon detection of a threat event, the endpoint computer generates computer security threat data for the threat event. The threat data may include user identifiable data that can be used to identify a user in the enterprise network. The endpoint computer encrypts the user identifiable data prior to sending the threat data to a smart protection network or to an enterprise server where threat data from various enterprise networks are collected for analysis. The endpoint computer may also encrypt an identifier for the threat data and provide the encrypted identifier to the smart protection network and to an enterprise server in the enterprise network. The enterprise server may use the encrypted identifier to retrieve the threat data from the smart protection network to generate user-specific reports.

8 Claims, 4 Drawing Sheets

(56) References Cited

U.S. PATENT DOCUMENTS

| | | |
|---|---|---|
| 7,353,533 B2 | 4/2008 | Wright et al. |
| 7,395,436 B1 | 7/2008 | Nemovicher |
| 7,472,422 B1 * | 12/2008 | Agbabian .................. 726/25 |
| 8,239,668 B1 | 8/2012 | Chen et al. |
| 2006/0070128 A1 * | 3/2006 | Heimerdinger et al. ........ 726/23 |
| 2007/0214151 A1 * | 9/2007 | Thomas et al. ................ 707/10 |
| 2008/0127338 A1 * | 5/2008 | Cho et al. .................... 726/22 |
| 2009/0299904 A1 * | 12/2009 | Tsai ............................. 705/50 |

* cited by examiner

COMPUTER SECURITY THREAT DATA COLLECTION AND AGGREGATION WITH USER PRIVACY PROTECTION

CROSS-REFERENCE TO RELATED APPLICATION

This application is a continuation of U.S. application Ser. No. 12/424,419, filed on Apr. 15, 2009, which is incorporated herein by reference in its entirety.

BACKGROUND OF THE INVENTION

1. Field of the Invention

The present invention relates generally to computer security, and more particularly but not exclusively to collection of computer security threat data.

2. Description of the Background Art

Computer security threats, such as malicious codes (e.g., computer virus, worm, spyware, Trojan, key loggers), online threats (e.g., malicious websites, phishing, spam), and network threats (e.g., unauthorized intrusion and data access, prohibited use of company-issued computers), have become more sophisticated. Consequently, computer security products have to be constantly updated just to keep pace with the ever increasing number of security threats. While some security threats are relatively benign, some are very destructive and even capable of bringing down entire networks. It is thus critical to detect and learn the behavior of emerging security threats as soon as possible, before widespread propagation over the Internet.

SUMMARY

In one embodiment, an endpoint computer in an enterprise network is configured to detect computer security threat events, such as presence of a computer virus. Upon detection of a threat event, the endpoint computer generates computer security threat data for the threat event. The threat data may include user identifiable data that can be used to identify a user in the enterprise network. The endpoint computer encrypts the user identifiable data prior to sending the threat data to a smart protection network or to an enterprise server where threat data from various enterprise networks are collected for analysis. The endpoint computer may also encrypt an identifier for the threat data and provide the encrypted identifier to the smart protection network and to an enterprise server in the enterprise network. The enterprise server may use the encrypted identifier to retrieve the threat data from the smart protection network and use the threat data to generate user-specific reports.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
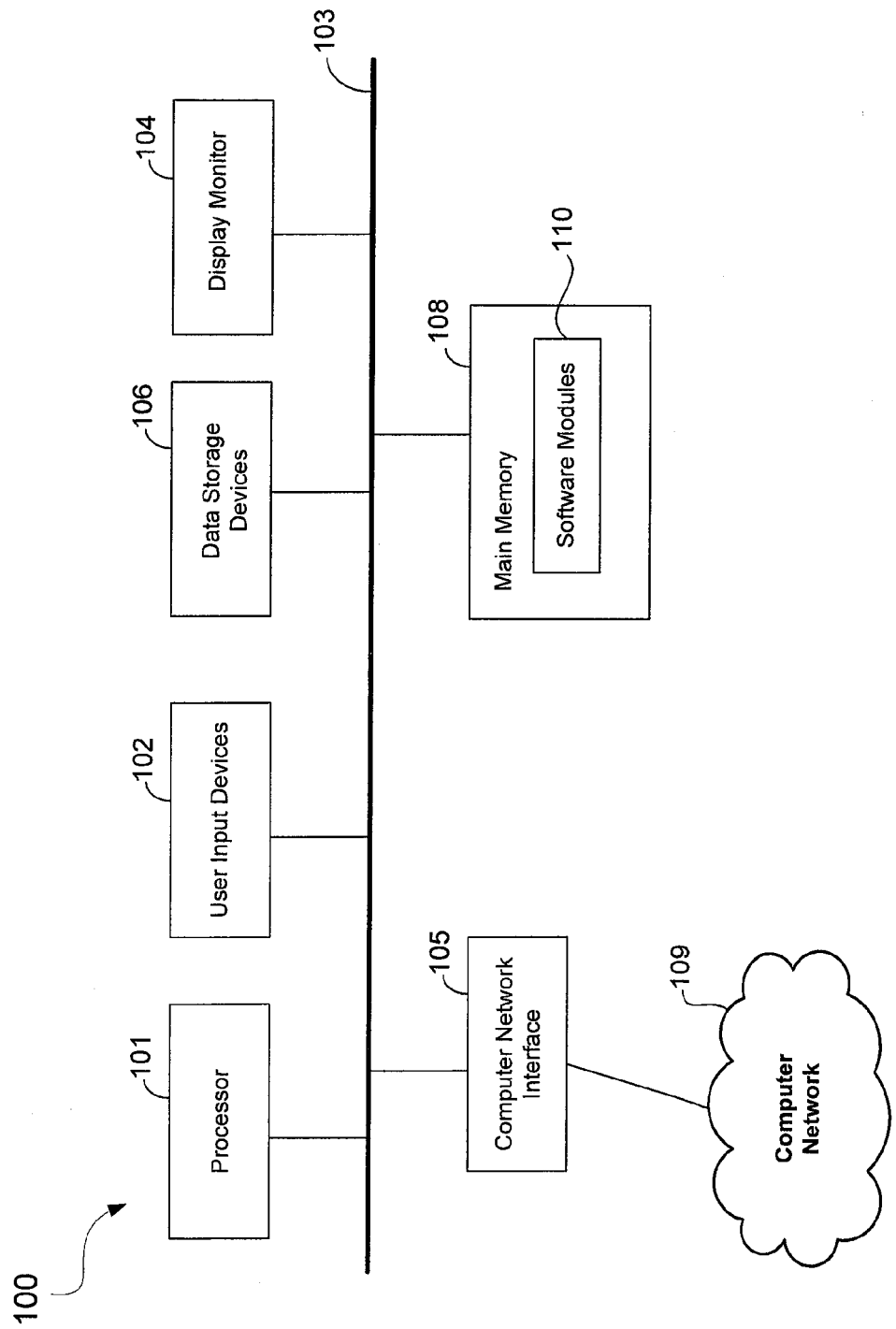
FIG. 1 shows a schematic diagram of a computer in accordance with an embodiment of the present invention.
Figure 2:
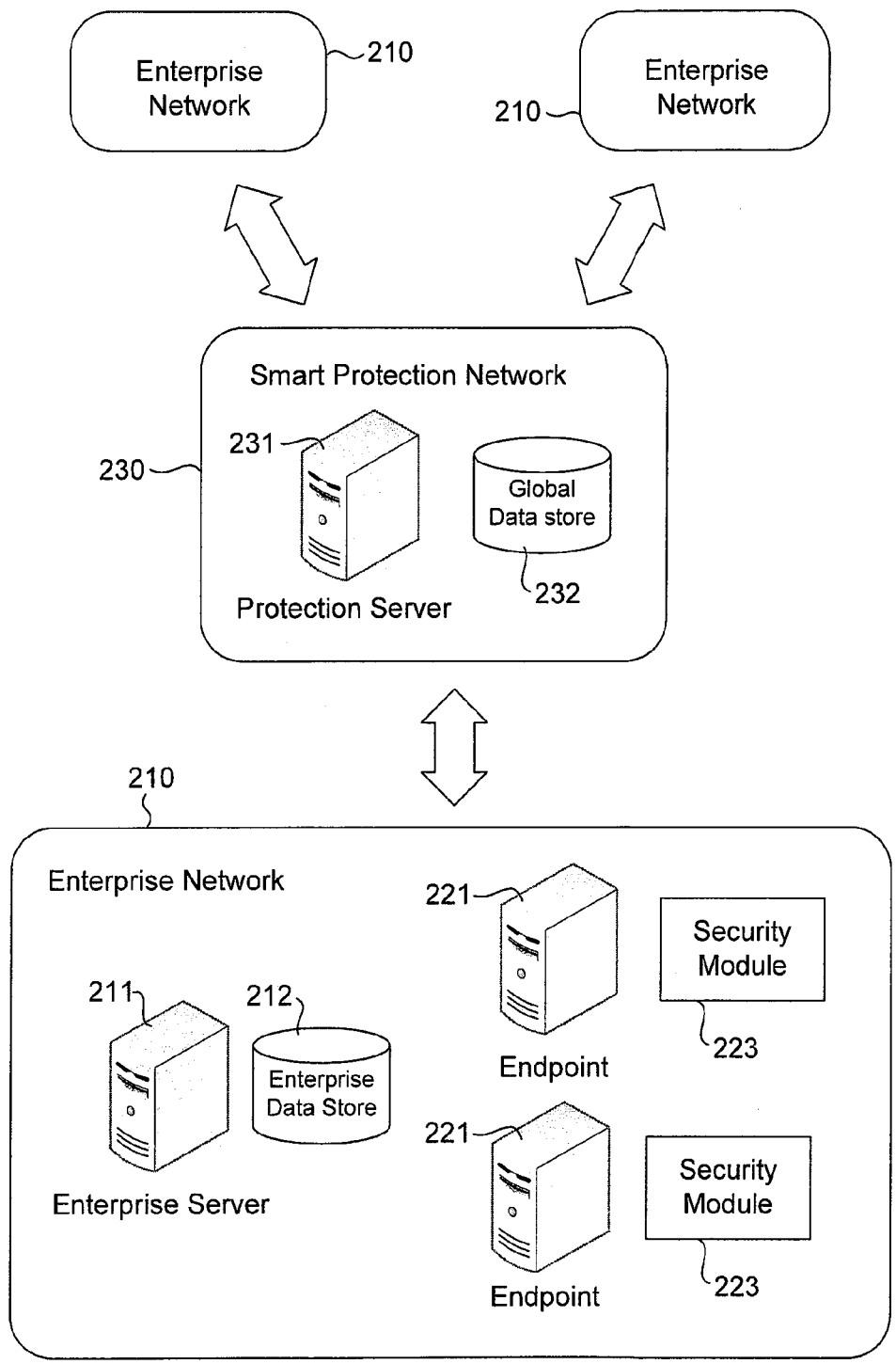
FIG. 2 schematically shows a system for collecting and aggregating computer security threat data in accordance with an embodiment of the present invention.
Figure 3:
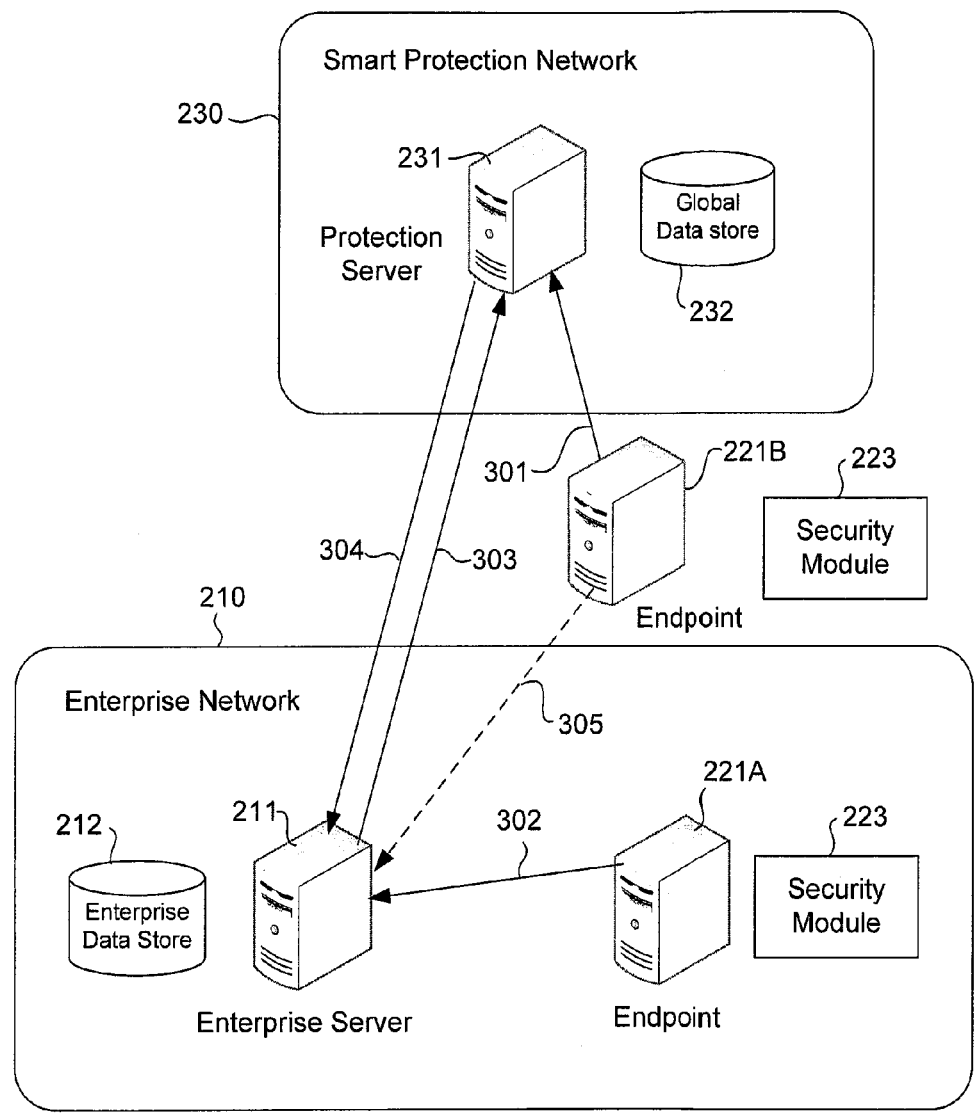
FIG. 3 shows a flow diagram illustrating collection of computer security threat data in accordance with an embodiment of the present invention.

Referring now to FIG. 1, there is shown a schematic diagram of a computer 100 in accordance with an embodiment of the present invention. The computer 100 may be employed as an endpoint computer 221 (221 in FIG. 2, 221A and 221B in FIG. 3), an enterprise server 211, or a protection server 231, which are shown in FIGS. 2 and 3. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109.

In the example of FIG. 1, the main memory 108 includes software modules 110, which may comprise computer-readable program code of an endpoint computer 221, an enterprise server 211, or a protection server 231. The software modules 110 may be loaded from a data storage device 106 to the main memory 108 for execution by the processor 101.

FIG. 2 schematically shows a system for collecting and aggregating computer security threat data in accordance with an embodiment of the present invention. In the example of FIG. 2, the system includes a plurality of enterprise networks 210 and one or more smart protection networks 230. The enterprise networks 210 and a smart protection network 230 may comprise separate, unrelated computer networks that have access to the Internet.

The enterprise networks 210 may comprise separate computer networks belonging to different and unrelated entities (e.g., corporation, government, small business). The enterprise networks 210 may also belong to the same entity. For example, each of the enterprise networks 210 may be a branch office or division of the same company. Regardless, the enterprise networks 210 are shown as separate networks in FIG. 2 to emphasize that each performs its own computer security functions and does not share computer security threat data with other enterprise networks, which is typically the case when the enterprise networks 210 belong to unrelated entities.

In the example of FIG. 2, an enterprise network 210 comprises an enterprise server 211 and a plurality of endpoint computers 221. An endpoint computer 221 may comprise a node of the enterprise network 210 where a computer security function is performed. For example, an endpoint computer 221 may comprise a computer security appliance, a gateway computer, a user client computer (e.g., desktop laptop), etc. An endpoint computer 221 may include a security module 223. A security module 223 may comprise computer-readable program code for performing antivirus, anti-spam, online protection, and/or other computer security function provided by commercially available computer security products, such as those available from Trend Micro Inc. For example, the security module 223 may scan files in or passing through the endpoint computer 221 for viruses. As another example, the security module 223 may monitor websites visited by the user of the endpoint computer 221 and check the websites for malicious or inappropriate content, or violation of company policy (e.g., access of pornography websites using company computer during work hours). Yet another example, the security module 223 may filter spam emails received in the endpoint computer 221. As will be more apparent below, the endpoint computer 221 is configured to detect and report to the smart protection network 230 computer security threat events, such as a computer virus infected file, access of prohibited or malicious website, etc., detected by the security module 223.

An enterprise server 211 may comprise a server computer configured to maintain enterprise-related data in an enterprise data store 212. The enterprise data store 212 may comprise a commercially available database storing, among other information, computer security threat data detected by an endpoint computer 221.

Computer security threat data may comprise information about computer security threat events. Computer security threat data may include the name of the endpoint computer 221, the assigned user of the endpoint computer 221, the IP address of the endpoint computer 221, and other data relating to the computer security threat event, such as a file or information about a file infected with a virus, the URL (uniform resource locator) of a website accessed by or through the endpoint computer 221, a spam email received in the endpoint computer 221, firewall and network access logs to and from the endpoint computer 221, and suspicious data content in files and emails transferred to and from the endpoint computer 221.

Each computer security threat data may have an associated identifier, such as a globally unique identifier (GUID). The GUID of the threat data may be assigned and provided by the endpoint computer 221 that detected the computer security threat event. The GUID of a threat data may include in part a common identifier of endpoint computers belonging to the same enterprise. The enterprise server 211 and the endpoint computer 221 may communicate over a local area network (LAN) within the enterprise network 210.

The smart protection network 230 may comprise a computer network for collecting and aggregating computer security threat data received from the enterprise networks 210. In the example of FIG. 2, the smart protection network 230 comprises one or more protection servers 231. A protection server 231 may comprise a server computer with a global data store 232. The global data store 232 may comprise a commercially available database containing security threat data collected from endpoint computers 221 of various subscribing enterprise networks 210.

The smart protection network 230 advantageously collects computer security threat data from enterprise networks 210 to allow for detection and analysis of emerging computer security threats. In one embodiment, the protection server 231 may be configured to receive computer security threat data from endpoint computers 221 of various enterprise networks 210, store the computer security threat data in the global data store 232, and aggregate the collected computer security threat data to detect an emerging computer security threat. As a particular example, the protection server 231 may receive threat data regarding virus infected files from endpoint computers 221 of different enterprise networks 210. The antivirus researchers operating the smart protection network 230 may aggregate the threat data and identify files that are infected by the same computer virus within a particular time frame, and conclude that that virus is propagating over the Internet (since the virus is found in different enterprise networks 210). That is, the aggregated threat data may identify a common computer security threat, such as a particular virus, in different enterprise networks 210. The antivirus researchers or threat correlation algorithms may generate an antidote to the computer virus and distribute the antidote to subscribing enterprise networks 210, including those not yet infected. The antivirus researchers or automated mechanisms may also alert administrators of the enterprise networks 210, allowing for increased security (e.g., limit or prohibit some network access during the virus outbreak) in their respective networks. This helps minimize damage to infected enterprise networks 210, but more importantly allows for timely securing of enterprise networks 210 yet to be infected. Such early detection and warning of potential computer virus outbreaks would be relatively difficult to accomplish by looking at computer security threat events in isolation within individual enterprise networks 210.

FIG. 3 shows a flow diagram illustrating collection of computer security threat data in accordance with an embodiment of the present invention. In practice, the smart protection network 230 communicates with all subscribing enterprise networks 210. In FIG. 3, only one enterprise network 210 is shown as communicating with the smart protection network 230 for clarity of illustration. In the example of FIG. 3, the endpoint computer 221 is shown in two possible locations: one labeled as 221A inside the enterprise network 210, and another labeled as 221B outside the boundaries of the enterprise network 210 (e.g., on the Internet) and may not have direct connection to the enterprise network 210.

The endpoint computer 221, whether inside or outside the enterprise network 210, detects a computer security threat event using the security module 223. The endpoint computer 221 is configured to generate computer security threat data ("threat data") for each computer security threat event ("threat event"). The endpoint computer 221 assigns an identifier in the form of a GUID to each computer security threat data for subsequent retrieval and analysis. In one embodiment, the GUID is configured to identify not just the threat data but also the particular enterprise network 210 where the threat event was detected.

In one embodiment, the endpoint computer 221 is configured to separate the threat data into two parts: user identifiable data and non-user identifiable data. The user identifiable data comprise threat data that can be used to identify a user in the enterprise network 210. Examples of user identifiable data include the name of the user of the endpoint computer 221, the IP address of the endpoint computer 221, email addresses, access authentication information, and email/file content. Non-user identifiable data comprise threat data that cannot be used to identify a user of the endpoint computer 221. Examples of non-user identifiable data include the URL or domain name of a malicious website visited by the user, copies of virus-infected files, network access logs, common email spam content, malware behavior logs, malware file parameters (paths, registry, name, size, etc), and malware correlation summary.

In one embodiment, the endpoint computer 221 is configured to encrypt user identifiable data of the threat data. The endpoint computer 221 may also be configured to encrypt the GUID of the threat data. The encryption of the GUID prevents identification of the enterprise associated with the threat data. Any suitable encryption/decryption algorithm may be employed without detracting from the merits of the present invention. In one embodiment, the key to decrypt the encrypted user-identifiable data is only available within the enterprise network 210 where the threat data originated. For example, the encrypted user identifiable data may only be decrypted by the enterprise server 211 in the same enterprise network 210 as the endpoint computer 221. The definition of enterprise network covers the constant changing enterprise network boundaries which can be extended with secure networking infrastructure such as VPNs. In this definition, enterprise network can mean any secured enterprise endpoint machine where the decryption keys for the encrypted user identifiable data reside. User identifiable data encryption prevents identification of the user from outside the enterprise network 210, alleviating privacy concerns. Addressing privacy concerns is particularly important in this case because the global data store 232 where the threat data will be maintained may include threat data from various, separately owned and operated enterprise networks 210. The non-user identifiable data are preferably not encrypted to allow antivirus researchers operating the smart protection network 230 to readily analyze the non-user identifiable data and aggregate them with non-user identifiable data from other enterprise networks 210.

In the example of FIG. 3, the endpoint computer 221 outside the enterprise network 210 (see 221B) sends the threat data and encrypted GUID to the protection server 231 of the smart protection network 230 (arrow 301). The encrypted GUID is associated with an enterprise and can be retrieved from the enterprise server 211 using common authentication mechanisms. The threat data may include the encrypted user-identifiable data and the unencrypted non-user identifiable data. The endpoint computer 221 may forward the threat data to the enterprise server 211 (arrow 305) when it is possible to do so (e.g., when the endpoint computer 221 logs onto the enterprise network 210). The protection server 231 stores the threat data and associated encrypted GUID in the global data store 232. Although the protection server 231 cannot readily decrypt the encrypted user identifiable data, storage of the encrypted user-identifiable data in the global data store 232 facilitates central storage. This implementation is useful in both the migration of data and in supporting mobile devices which may roam outside of enterprise network 210 boundaries but still have connection to the Internet and, through the Internet, access the smart protection network 230. When the endpoint computer 221 is outside of the enterprise network 210 boundaries, all threat data can be sent to the protection server 231 of the smart protection network 230. The enterprise server 211 can retrieve threat data via requesting threat data associated the encrypted GUID which is in turn associated with the enterprise (arrow 303).

When the end point computer 221 is inside the boundaries of the enterprise network 210 (see 221A), it forwards threat data to the enterprise server 211 (arrow 302). The enterprise server 211 may analyze and filter the threat data to forward to the smart protection network 230 (arrow 303) for reporting, analysis, or other purpose. In the example of FIG. 3, the enterprise server 211 may also send a request for the threat data to the smart protection network 230 (arrow 303). The request may include a reference matching the encrypted GUID of the requested threat data. The protection server 231 receives the request and queries the global data store 232 using the reference to the encrypted GUID. To facilitate retrieval, the encrypted GUID or the request itself may include an indicator that the request is for threat data from a particular enterprise network 210. The protection server 231 retrieves the requested threat data from the global data store 232, and forwards the requested threat data to the enterprise network 210 (arrow 304). In the enterprise network 210, the enterprise server 211 receives the threat data and stores the threat data in the local enterprise data store 212. The enterprise server 211 may decrypt the encrypted user identifiable data prior to storage in the enterprise data store 212. The threat data in the enterprise data store 212 may be employed for a variety of purposes, including for generation of user-specific reports. For example, the enterprise server 211 may be configured to examine threat data from the user of the endpoint computer 221 to determine if the user has been visiting inappropriate or company-prohibited websites using the endpoint computer 221.

As can be appreciated from the foregoing, embodiments of the present invention allow for threat data collection and aggregation from separate enterprise networks 210 while maintaining privacy protection for both the enterprise and the users within individual enterprise networks 210. This advantageously allows a third party computer security provider to collect and aggregate threat data from separate and unrelated companies, allowing for timely detection of emerging computer security threats not otherwise readily detectable from a computer network of a single company.

Figure 4:
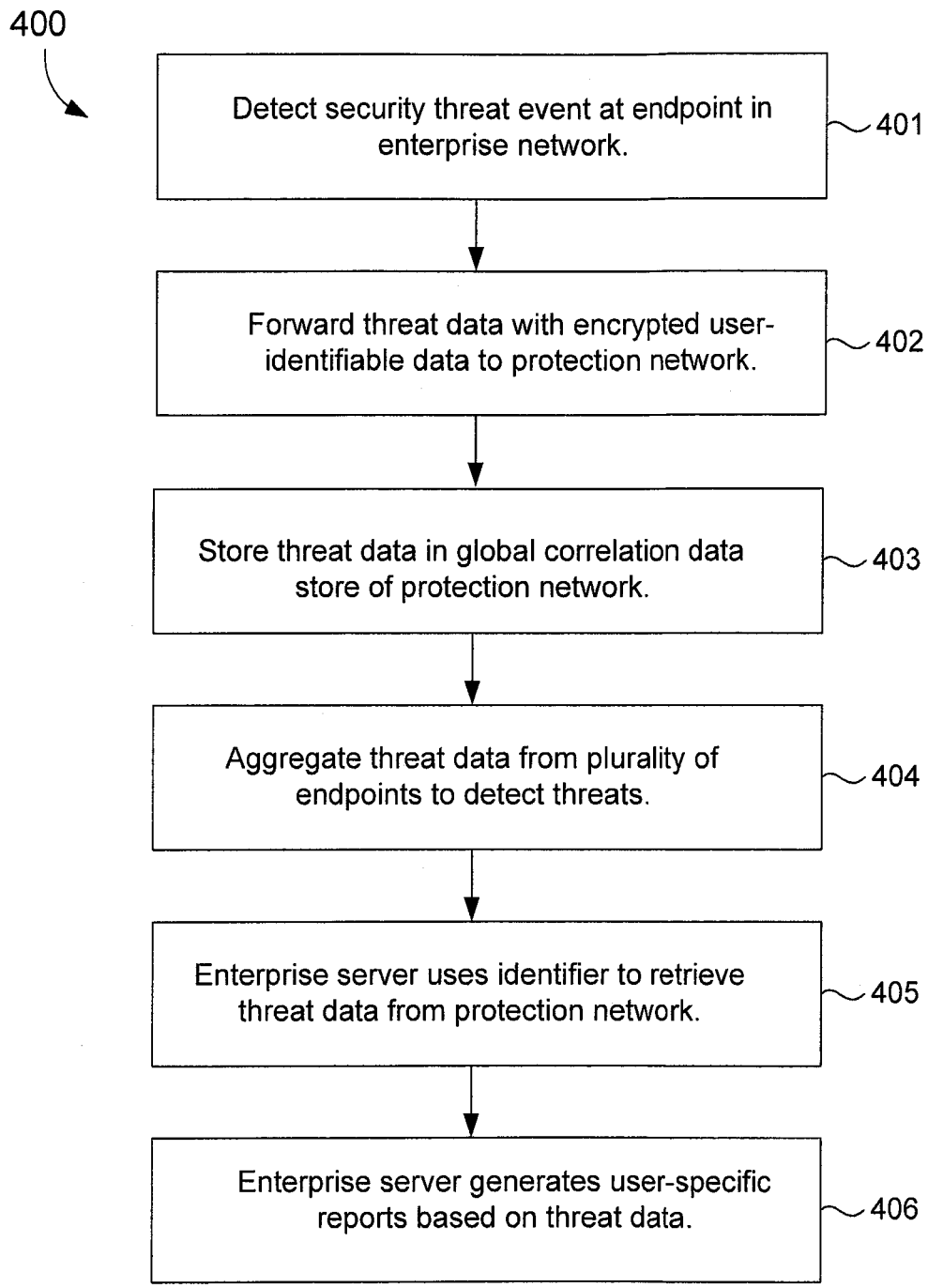
FIG. 4 shows a flow diagram of a method of collecting and aggregating computer security threat data in accordance with an embodiment of the present invention.

FIG. 4 shows a flow diagram of a method 400 of collecting and aggregating computer security threat data in accordance with an embodiment of the present invention. The method 400 is explained using the components shown in FIG. 2 for illustration purposes only. Other components may also be used without detracting from the merits of the present invention. As a particular example, one or more steps of the method 400 may be performed by computer-readable program code executed by a processor in the memory of an endpoint computer, enterprise server, or protection server as applicable.

In the method 400, an endpoint computer in an enterprise network detects a computer security threat event (step 401). The endpoint computer generates threat data and associated identifier, such as a GUID, for the threat event and forwards them to a protection server of a smart protection network (step 402) directly or by way of an enterprise server in the same enterprise network as the endpoint computer. The threat data may have user identifiable data and non-user identifiable data. The user identifiable data and the identifier may be encrypted prior to forwarding the threat data to the protection server.

In the smart protection network, the protection server, which receives the threat data and the encrypted identifier, stores the threat data and the encrypted identifier in a global correlation data store (step 403) along with threat data and encrypted identifiers from other enterprise networks. The protection server may be used to aggregate threat data from various enterprise networks to detect and analyze emerging computer security threats (step 404).

In the enterprise network, the enterprise server may use a reference to the encrypted identifier to retrieve the threat data from the smart protection network (step 405). The enterprise server may provide the encrypted identifier to the protection server, which matches the encrypted identifier to the threat data collected from the endpoint computer in step 402. The protection server retrieves the threat data and forwards the threat data to the enterprise server. The enterprise server may be used to generate user-specific reports based on the threat data (step 406). For example, the enterprise server may be configured to generate a report listing the threat events that occurred in the endpoint computer. The report may indicate the websites visited by the user to whom the endpoint computer is assigned, infected computer files in the endpoint computer, emails received by the user in the endpoint computer, and so on.

Methods and apparatus for collecting and aggregating computer security threat data have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implement method of collecting computer security threat data, the method comprising:
    detecting a first computer security threat event at a first computer in a first computer network;
    generating a first computer security threat data based on the first computer security threat event, the first computer security threat data including a first user identifiable data that can be used to identify a first user of the first computer in the first computer network and a first non-user identifiable data relating to the first computer security threat event;
    encrypting the first user identifiable data to generate a first encrypted user identifiable data;
    forwarding the first computer security threat data that includes the first encrypted user identifiable data from the first computer to a first server computer that cannot decrypt the first encrypted user identifiable data over the Internet;
    detecting a second computer security threat event at a second computer in a second computer network that is different from the first computer network;
    generating a second computer security threat data based on the second computer security threat event, the second computer security threat data including a second user identifiable data that can be used to identify a second user in the second computer network and a second non-user identifiable data relating to the second computer security threat event;
    encrypting the second user identifiable data to generate a second encrypted user identifiable data;
    forwarding the second computer security threat data that includes the second encrypted user identifiable data from the second computer to the first server computer that cannot decrypt the second encrypted user identifiable data over the Internet, the first server computer being in a third computer network that is different from the first and second computer networks; and
    aggregating in the first server computer the first computer security threat data and the second computer security threat data to identify a common computer security threat in the first and second computer networks, wherein the common computer security threat is a computer security threat that is present in the first computer network and in the second computer security network.

2. The method of claim 1 wherein the common computer security threat comprises a computer virus.

3. The method of claim 1 further comprising:
    using the first computer security threat data in a second server computer to generate a report about the first user.

4. The method of claim 3 wherein the report lists websites visited by the first user using the first computer.

5. The method of claim 1 wherein the first computer security threat event detected at the first computer comprises identification of a virus-infected file.

6. The method of claim 1 wherein the first computer security threat event detected at the first computer comprises navigation of the first user to a particular website using the first computer.

7. The method of claim 1 wherein the first user identifiable data comprise a name of the first user.

8. The method of claim 1 wherein the first non-user identifiable data comprise a virus-infected file.

* * * * *